United States Patent
Blank et al.

(10) Patent No.: US 8,725,480 B2
(45) Date of Patent: May 13, 2014

(54) ARRANGEMENT AND METHOD FOR OPTIMIZING THE OPERATION OF A SUPPLY NETWORK

(75) Inventors: Frederik Blank, Heidelberg (DE); Markus Gauder, Hockenheim (DE); Werner A. Schmidt, Heddesheim (DE)

(73) Assignee: ABB Technology AG, Zürich (CH)

( * ) Notice: Subject to any disclaimer, the term of this patent is extended or adjusted under 35 U.S.C. 154(b) by 0 days.

(21) Appl. No.: 13/560,755

(22) Filed: Jul. 27, 2012

(65) Prior Publication Data

US 2012/0316852 A1 Dec. 13, 2012

Related U.S. Application Data

(63) Continuation of application No. PCT/EP2011/000361, filed on Jan. 27, 2011.

(30) Foreign Application Priority Data

Jan. 27, 2010 (DE) .......................... 10 2010 005 955

(51) Int. Cl.
*G06G 7/48* (2006.01)
(52) U.S. Cl.
USPC .................................................. 703/10
(58) Field of Classification Search
USPC .................................................. 703/10
See application file for complete search history.

(56) References Cited

U.S. PATENT DOCUMENTS 5,873,251 A 2/1999 Iino
6,681,155 B1 1/2004 Fujita et al.

FOREIGN PATENT DOCUMENTS

DE 10 2006 034 347 A1 1/2008

OTHER PUBLICATIONS

Rawtani: Chapter 9: Operator and supervisor interface; in Practical Batch Process Management; Copyright IDC Technologies 2005; pp. 86-92.*
Burrows et al.: Utilisation of network modelling in the operational management of water distribution systems; Urban Water 2 (2000) 83-95.*
Shamir: Optimal Real-Time Operation Of Urban Water Distribution Systems Using Reduced Models; Journal Of Water Resources Planning And Management ASCE / Mar./Apr. 2008; pp. 181-186.*
Maschler et al.: Simplification of Water Supply Network Models through Linearisation, Centre for Water Systems, Report No. 99/01, School of Engineering, University of Exeter, Exeter, United Kingdom, p. 119; 1999.*

(Continued)

*Primary Examiner* — Hugh Jones
(74) *Attorney, Agent, or Firm* — Buchanan Ingersoll & Rooney PC

(57) ABSTRACT

An exemplary arrangement for determining set point values for controllable elements in a network that includes a management system for driving elements of the network and a plurality of processing units. The arrangement also includes at least one simulation unit with a simulation environment for generating a hydraulic simulation model of the network, and an optimization unit with an optimization environment for converting and simplifying the hydraulic simulation model. The optimization environment receives exported data from the simulation environment, generates a simplified optimization model from the exported data through an algorithm that is implemented through program code executed by a processor, and uses the optimization model and at least one of received additional data and measurement and field data to calculate optimized flow charts as temporally changeable set point value series for driving elements in the network and providing the driven elements to the management system.

20 Claims, 2 Drawing Sheets

(56) References Cited

OTHER PUBLICATIONS

Lang et al.: Model Reduction in the Numerical Simulation and Optimization of Water-Networks; course description; Graduate Scool of Engineering; TU Darmstadt; one page; 2008.*

Skworcow et al.: Optimal pump scheduling with pressure control aspects: Case studies. Integrating Water Systems: Proceedings of the 10th International Conference on Computing and Control in the Water Industry. 2009; 7 pages.*

Edwards et al.: GIS and hydraulic model integration: Implementing cost-effective sustainable modeling solutions; Journal AWWA • 101:11; pp. 34-42.*

Aubrun et al.; Design of a supervised control system for a sludge dewatering process; Control Engineering Practice 11 (2003) 27-37.*

Notification of Transmittal of Translation of the International Preliminary Report on Patentability (Forms PCT/IB/338 and PCT/IPEA/409) dated Sep. 20, 2012, issued in corresponding International Application No. PCT/EP2011/000361. (11 pages).*

Kawai et al. Advanced automation for power-generation plants—past, present and future; Control Engineering Practice 7 (1999) 1405-1411.*

International Search Report (PCT/ISA/210) issued on Jul. 20, 2011, by the European Patent Office as the International Searching Authority for International Application No. PCT/EP2011/000361, 2 pages.

International Preliminary Report on Patentability (PCT/IPEA/409) issued on Jul. 7, 2012, by the European Patent Office as the International Searching Authority for International PCT/EP2011/000361, 26 pages.

B. Ulanicki et al., "Using a GAMS modeling environment to solve network scheduling problems" Measurement + control, vol. 32, May 1999, pp. 110-115.

* cited by examiner

ARRANGEMENT AND METHOD FOR OPTIMIZING THE OPERATION OF A SUPPLY NETWORK

RELATED APPLICATION(S)

This application is a bypass continuation under 35 U.S.C. §120 of International application PCT/EP2011/000361 which designates the U.S. and claims priority to German application DE 10 2010 005 955.2 filed in Germany on Jan. 27, 2010. The contents of which are hereby incorporated by reference in their entireties.

FIELD

The disclosure relates to an arrangement for optimizing the operation of a supply network, and a method for optimizing the operation of a supply network.

BACKGROUND INFORMATION

For utility companies focusing on gas, water and heating supply, increasing demands are being placed on improving the performance and therefore also the efficiency and effectiveness of the operation of this supply. Increasing energy costs, a call for continuously improving the quality of the supply, the consideration of carbon dioxide emissions, as well as the implementation of corresponding measures for reducing these carbon dioxide emissions is reasons for these increasing demands.

Known utilities use of network simulation systems is widespread in energy supply companies and is the standard in the operation of water networks. In respect of the operation of water networks, hydraulic simulation models provide, inter alia, the calculation of pressures, flows, flow rates, tank fill levels, and parameters for the water quality and the quality of the infrastructure with respect to lines or individual nodes in a water network.

Hydraulic simulations are likewise used for planning purposes in respect of specific scenarios. They can be used for simulating short-term operations, such as user interventions, but also for analyzing long-term strategic decisions, such as network expansions. The simulation models are calibrated by virtue of measured values from field measurements being fed at continuous intervals and model parameters being matched. As a result, the characteristic behavior of the real network is intended to be represented. Furthermore, changes to the network configuration and topology of the water network should be regularly incorporated in the simulation model. The purpose of the calibration is to match the theoretical model to the real network.

In addition, the prior art has disclosed methods for optimizing the operation of water networks in which cost-optimal flow charts for pumps, valves and preparatory work are calculated. Such a method is disclosed, for example, in "Using a GAMS modelling environment to solve network scheduling problems", B. Ulanicki, P. L. M. Bounds, J. P. Rance, Measurement+Control, Volume 32, May 1999, pages 110-115. The determination is performed based on a target function, the physical structure of the respective network, systems of mathematical equations, physical and operational boundary conditions, and real-time measurements.

The functionality of optimization and use planning of pumps, valves, reservoirs, stores is not supported by network simulation systems since the focus of the use of such systems and the knowledge for setting up and configuring this optimization functionality differs greatly from what is used in developing simulation models. Therefore, in many cases additional techniques, specific algorithms or solvers for algorithms can be used in order to solve an optimization problem or an optimization task.

To this extent, at present, if optimization and an establishment of use plans or updating of use plans is desired, there is usually no way past installation of a new system which, in addition to the possibilities of the simulation, also makes it possible to implement optimization computation or calculations.

One disadvantage to these known systems is that investment, which has already been made, cannot be safeguarded and an additional degree of effort and resources should be implemented in order to set up a new, expanded modeling system. Furthermore, new experience in dealing with the new network modeling system should be acquired, which generally involves a loss of efficiency.

SUMMARY

An exemplary arrangement for determining set point values for controllable elements in a network including one of a supply network, a water network, or a water supply network is disclosed. The arrangement comprising: a management system for driving elements of the network and a plurality of processing units; at least one simulation unit with a simulation environment for generating a hydraulic simulation model of the network, which relates to a plane of nodes that include distribution and withdrawal points of the network; and an optimization unit with an optimization environment for converting and simplifying the hydraulic simulation model, wherein the optimization environment receives exported data from the simulation environment, generates a simplified optimization model from the exported data through an algorithm that is implemented through program code executed by a processor, and uses the optimization model and at least one of received additional data and measurement and field data to calculate optimized flow charts as temporally changeable set point value series for driving elements in the network and providing the driven elements to the management system, wherein said exported data describes a physical structure of the hydraulic simulation model and elements thereof, and wherein the algorithm reduces a number of existing model nodes and model equations in the simplified optimization model.

An exemplary method for determining set point values for controllable elements of a network including one of a supply network, a water network, or a water supply network of a water supply company is disclosed. The method being executed in an arrangement of the water company including a management system for driving elements of the network and a plurality of processing units; at least one simulation unit with a simulation environment for generating a hydraulic simulation model of the network, which relates to a plane of nodes that include distribution and withdrawal points of the network; and an optimization unit with an optimization environment for converting and simplifying the hydraulic simulation model. The method comprising: receiving, in the optimization environment, data exported by the simulation environment and additional data in the optimization environment; generating a simplified optimization model from the exported data through an algorithm that is implemented through program code executed by a processor; calculating optimized flow charts as temporally changeable set point value series for driving elements in the network based on the optimization model and at least one of received additional data and measurement and field data; and providing the driven elements to the management system, wherein said exported data describes a physical structure of the hydraulic simulation model and elements thereof, and wherein the algorithm reduces a number of existing model nodes and model equations in the simplified optimization model.

An exemplary computer readable medium with program code stored thereon of a method for determining set point values for controllable elements of a network including one of a supply network, a water network, or a water supply network of a water supply company is disclosed. The method being executed in an arrangement of the water company including a management system for driving elements of the network and a plurality of processing units; at least one simulation unit with a simulation environment for generating a hydraulic simulation model of the network, which relates to a plane of nodes that include distribution and withdrawal points of the network; and an optimization unit with an optimization environment for converting and simplifying the hydraulic simulation model. The computer readable medium when placed in communicable contact with at least one of the plurality of processing units causes the at least one processing unit to execute the method comprising: receiving, in the optimization environment, data exported by the simulation environment and additional data in the optimization environment; generating a simplified optimization model from the exported data through an algorithm that is implemented through program code executed by a processor; calculating optimized flow charts as temporally changeable set point value series for driving elements in the network based on the optimization model and at least one of received additional data and measurement and field data; and providing the driven elements to the management system, wherein said exported data describes a physical structure of the hydraulic simulation model and elements thereof, and wherein the algorithm reduces a number of existing model nodes and model equations in the simplified optimization model.

BRIEF DESCRIPTION OF THE DRAWINGS

These and other aspects of the disclosure will become apparent from the following descriptions when taken in combination with the accompanying drawings in which.

DETAILED DESCRIPTION

Figure 1:
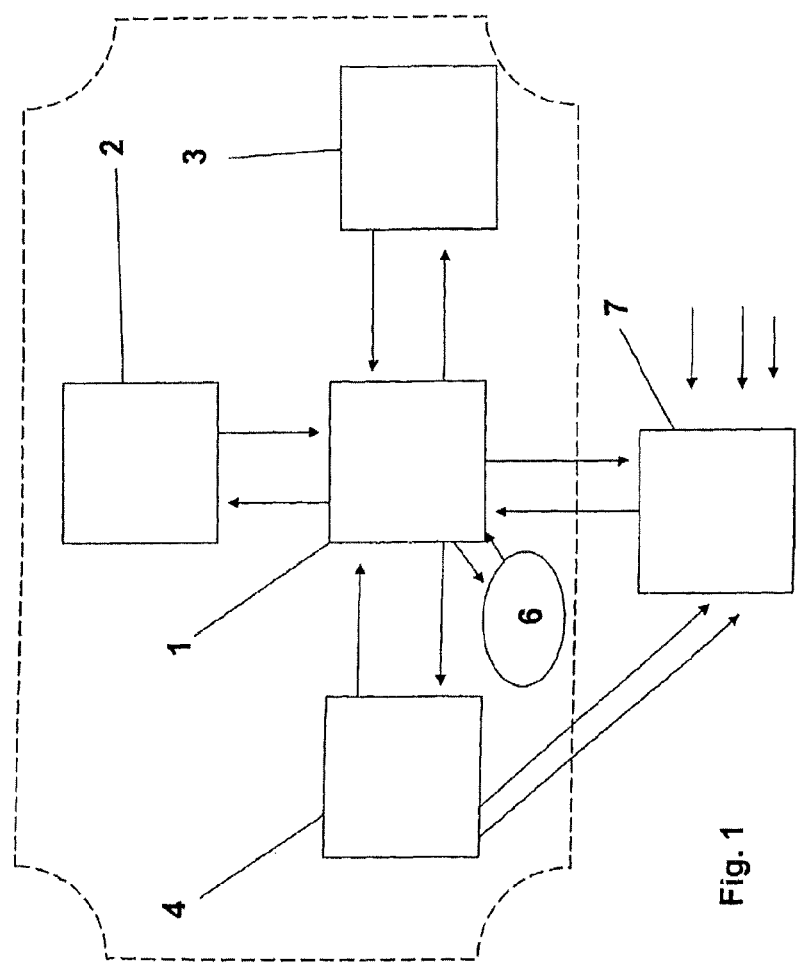
FIG. 1 shows a schematic view of an arrangement for optimizing the running or operating mode of water networks in accordance with an exemplary embodiment of the present disclosure.

Exemplary embodiments of the present disclosure are directed to specifying an arrangement and a method with which set point values for the actuators or elements of a water network are determined in such that the technical operation of the water network proceeds without any problems, proceeds with comparatively little complexity, and proceeds efficiently and reliably, while at the same time avoiding the implementation of two different network modeling systems.

According to an exemplary arrangement for optimizing the operation of a supply network or a network, such as a water network or a water supply network, therefore includes a management system for driving elements in a supply network or a network, a water network or a water supply network, and a plurality of processing units, wherein at least one simulation unit with a simulation environment (4) for generating a simulation model (5) of the water network or water supply network and an optimization unit with an optimization environment (7), which receives exported data from the simulation environment (4) and additional data and uses the exported data and additional data to determine optimized flow charts for driving the elements in the respective network, such as the respective water network or water supply network, are provided.

Accordingly, an exemplary arrangement disclosed herein is characterized by a plurality of processing units, which provide a simulation environment and an optimization environment, said optimization environment receiving data exported by the simulation environment and/or information and additional data and using the exported data and/or information and additional data to determine, establish, or calculate optimized use plans for driving the elements in the respective network, such as in a water network.

According to an exemplary embodiment of the disclosure, it has first been identified that there is a trend in the direction of optimization of networks, such as supply networks and water networks for operational support.

It has further been identified that, when improving the performance of a corresponding network (e.g., supply network or water network), network simulations, and optimizations play a key role. The use of these methods gives a better insight into the present status of the respective network, such as a water network. This is associated with the fact that additional information is generated, wherein already accessible sensor-based measurement values are included. With the aid of hydraulic simulation models, which relate to the plane of nodes, for example branch points, distribution points and extraction points, in a supply network, such as a water network, calculations of specific parameters on specific lines or at specific nodes in the respective network are made possible. In this case, measurements can only be performed at specific points in the network. The simulation also allows predictions, which are based on predictive modeling.

It has furthermore been identified that known network modeling systems do not provide the functionality of optimization and therefore further development should be undertaken. This further development can avoid the implementation of two different network modeling systems, namely one with and one without the functionality of optimization. The second network modeling system does not call for any simulation and therefore can be pared down.

To this extent, the complexity can be reduced and costs can be saved by virtue of known or existing arrangements being supplemented or retrofitted by or with an optimization environment. The optimization environment uses communicated data and information to establish use plans and setpoint values for the actuators or elements in the respective network, such as the respective water network. These use plans and setpoint values are optimized in the optimization environment taking into consideration a multiplicity of data and information and boundary conditions based on a target function and existing boundary conditions. With such an optimization environment, the running or the technical operation of a supply network such as a water network or a water supply network can be improved from the points of view of economy and energy efficiency.

In accordance with an exemplary embodiment, data exported from the simulation environment describes the physical structure of the respective network, such as the water network, and the functional elements thereof. As a result, the respective water network can be simulated reliably.

Provision can be made for the additional data to include and/or fix the target function of the optimization of the running or operating mode and physical and operational boundary conditions for the optimization of the operation. As a result, the optimization of the running mode of the supply network, such as the water network, can be implemented depending on physical boundary conditions, on operational boundary conditions, such as prices for energy and/or water and/or gas and/or availability, or on further data and information. The optimization of the running or operating mode can be updated by up-to-date inputting of additional data.

According to exemplary embodiments disclosed herein, the arrangement can have at least one data store, which also can be used for detecting historical data. The management system can read measured or established or detected values in time-dependent fashion from the respective data store and/or write said values to the data store. In this case, it is conceivable for the additional data to be read from the data store.

In an exemplary embodiment, the arrangement can have a further processing unit in the form of a prediction unit for predicting consumption of water, gas, or oil. As a result, consumer behavior can be detected and/or simulated.

According to another exemplary embodiment, the arrangement advantageously has a user interface, on which schedules or use plans can be visualized. The operator can therefore at any time gain access to the schedules or use plans, input values and/or setpoint values for the controllable elements in the respective network, such as the water network.

In another exemplary embodiment, the controllable elements in the supply network (e.g., the water network), include pumps and/or drives and/or control valves and/or meters and measuring devices and/or tanks. As a result, all suitable (e.g., network) elements in the field can be driven in accordance with the schedules or use plans and setpoint values.

According to exemplary embodiments disclosed herein, the arrangement for optimizing the running or operating mode of networks or supply networks such as water networks, makes it possible to operate the respective network in such a way that tanks or reservoirs are filled in a consumption-dependent and/or condition-dependent manner, e.g., when the available supply is at its greatest, e.g., the consumption or withdrawal from the network is at its lowest and/or the costs to be expended or the complexity involved are at their lowest, such as when current and treated water are at their most favorable and/or are available in large quantities and/or in which the pressure level in the lines is matched to the present demand and the demand expected in the future. This optimization can be realized by virtue of time-variable setpoint value series, namely schedules or use plans, being determined (e.g., calculated), for all controllable elements in the network, such as a water network. These also include, for example, nodes in the respective network, such as a water network, which are not controllable, however.

In this case, in addition to the physical structure of the respective network, simulated values, the prognosis of the consumption of water or gas or another conceivable raw material, auxiliary or fuel, the physical and operational boundary conditions, it is also possible for real-time measurements and up-to-date setpoint values of controllable elements to be taken into consideration and/or used or processed. In this case, the controllable elements can include selected or preselected pumps, pumping stations combining various pumps, control valves, and storage devices.

According to an exemplary embodiment, operational boundary conditions can include, for example, energy resources, with respect to energy costs, which are provided in real time and/or consumption values to be expected in the future, with respect to costs to be expected. In order that consumption data, and therefore prices or costs, which are as realistic or optimal as possible for current and/or for untreated water or treated water, can be taken into consideration in the optimization, a forecast time, for example, of 24 hours is set.

As a basis for the optimization, a calibrated simulation model can be used and/or provided in order to obtain both the physical structure of the supply network and of the respective water network and simulated values.

In a further exemplary embodiment, at least one processing unit can include a microprocessor, a PLC microcomputer, an ASIC, a personal computer, or the like.

In a further configuration, the various processing units can be integrated and/or implemented in the management system.

Exemplary embodiments of the present disclosure provide a method for optimizing the operation of a supply network, such as a water network, in which an arrangement of the above-described type is used, wherein data exported by the simulation environment and/or information and additional data are received by the optimization environment and the exported data and additional data are used to establish optimized schedules or use plans for driving controllable elements in the respective network, such as the respective water network.

According to exemplary embodiments described herein, the exported data describes the physical structure of the respective network, e.g., the water network, and the elements thereof. As a result, the respective water networks in a field can be simulated reliably.

The exemplary method can provide for the additional data to include and/or fix the target function of the optimization of the running or operating mode and physical and operational boundary conditions of the optimization of the operation. As a result, the optimization of the running mode of the supply network and of the water network can be implemented depending on physical boundary conditions, on operational boundary conditions, such as prices for energy and/or water and/or gas and/or availability, or on further data and information. The optimization of the running or operating mode can be updated by up-to-date inputting of additional data.

In an exemplary embodiment, provision can be made for historical data to be detected and/or stored on at least one data store designed and provided for this purpose. In accordance with an exemplary method, measured and/or established and/or detected values can be read in time-dependent fashion from the respective data store and/or written to the data store. In this case, it is conceivable for the additional data to also be read from the data store.

In a further exemplary embodiment of the method, a prediction of the consumption of water or gas or oil is implemented. As a result, consumer behavior can be detected and/or simulated.

Furthermore, exemplary embodiments of the present disclosure can provide provision for schedules or use plans to be visualized or to be capable of being visualized, for example on a display device and/or a user interface, with the result that the user is now capable of gaining access at any time to the schedules or use plans, input values and/or setpoint values for the controllable elements in the respective network, such as the water network.

The controllable elements in the supply network, or water network can include pumps and/or drives and/or control valves and/or meters and measuring devices and/or tanks. As a result, all of the network elements in the field can be drive as desired in accordance with the schedules or use plans and setpoint values.

The exemplary methods described herein for optimizing the running or operating mode of networks or supply networks, or water networks, makes it possible to operate the respective network in such a way that tanks or reservoirs are filled in a consumption-dependent and/or demand-dependent manner, e.g., when the available supply is at its greatest, e.g., the consumption or withdrawal from the network is at its lowest and/or the costs to be expended or the complexity involved are at their lowest, such as when current and treated water are at their most favorable and/or are available in large quantities and/or in which the pressure level in the lines is matched to the present demand and the demand expected in the future. This optimization is realized specifically by virtue of temporally variable setpoint value series, namely schedules or use plans, being established, or calculated, for all controllable elements in the network, such as in the water network. These also include, for example, nodes in the respective network, or water network, which are not controllable, however.

In this case, in addition to the physical structure of the respective network, simulated values, the prognosis of the consumption of water or gas or another consumable raw material, auxiliary or fuel, the physical and operational boundary conditions, it is also possible for real-time measurements and up-to-date setpoint values of controllable elements to be taken into consideration and/or used or processed. In this case, the controllable elements can include selected or preselected pumps, pumping stations, which combine different pumps, control valves, and storage devices.

Operational boundary conditions can include, for example, energy resources, with respect to energy costs, which are provided in real time and/or consumption values to be expected in the future, with respect to expected costs. In order that consumption data, and therefore prices or costs, which are as realistic or optimal as possible for current and/or for untreated water or treated water, can be taken into consideration in the optimization, a forecast time of several hours, e.g., 24 hours, is set.

As a basis for the optimization, a calibrated simulation model is used in order to obtain both the physical structure of the supply network and of the respective water network and simulated values.

As a further development, provision is made according to the method for a calibrated hydraulic network simulation model to be used as a basis in order to also use the methods for optimization from the prior art, with this network simulation model representing the physical supply network or the water network, for example by means of flows, pressures, tank and/or reservoir fill levels, demands and losses.

An optimization model can be derived from the hydraulic simulation model, with expanded model reduction and system identification techniques being applied.

Thereupon, physical and operational boundary conditions and the target function, which describes the elements to be optimized, can be defined.

For example, from the point of view of a fitter of management systems and/or automation systems for networks, one advantage of the disclosure described herein relates to its flexibility. The functionality of the optimization can be offered to all customers who have a network modeling system, which does not have an optimization function. This can be a distinguishing criterion for management systems and/or automation systems and provides considerable potential in respect of retrofits.

FIG. 1 shows a schematic view of an arrangement for optimizing the running or operating mode of water networks in accordance with an exemplary embodiment of the present disclosure. The arrangement as shown in FIG. 1 permits the calculation of the optimum schedules or use plans of the active elements in the water network. In an exemplary embodiment, the elements include, for example, control valves, and reservoir tanks.

The exemplary arrangement for optimizing the operation of a supply network or network in this case substantially includes a management system 1 for driving elements in a supply network and/or water network and a plurality of processing units, wherein at least one simulation unit 10 with a simulation environment 4 for generating a simulation model 5 of the water network or water supply network and an optimization unit with an optimization environment 7. The optimization environment 7 receives exported data from the simulation unit or simulation environment 4 and additional data, and uses the exported data and additional data to determine optimized flow charts for driving the elements in the respective network, respective water network, or water supply network, are provided, and used.

The exemplary arrangement shown in FIG. 1 permits the formation of an independent functionality of a hydraulic network modeling system. The possibility of optimization or the optimization unit 7 is implemented in the environment of the management system 1. Results of the optimization, such as a time series of setpoint values or schedules, can be used directly for driving the controllable elements, which are connected or have a communications link with or to the management system 1.

The results are visualized within the management system environment 1 for the information of the user and/or stored in a data store for historical data 2, also referred to below as historical data store, or an information management system.

In FIG. 1, the dashed line surrounds an already installed arrangement. The already installed arrangement includes the management system 1, the data store for historical data 2, a prediction unit 3 for predicting the consumption of water and a simulation environment 4 for generating a simulation model 5.

The management system 1 transmits control commands and schedules into the schematically illustrated field 6, in which the water network with its controllable elements is located. Measurement values, which indicate the status of the water network, are transmitted from the field 6 to the management system 1.

The management system 1 reads measured values from the data store for historical data 2 in time-dependent fashion and writes measured values to the historical data store 2 in time-dependent fashion.

The management system 1 receives values predicted by the prediction unit 3 relating to the consumption of water and provides measured consumption values to the prediction unit 3.

The management system 1 receives simulated results from the simulation unit 10 or the simulation environment 4 and provides values measured in real time to the simulation unit or the simulation environment 4. The simulation environment 4 cannot automatically implement an optimization function.

An optimization unit and optimization environment 7 which supplements the already installed arrangement provides optimized schedules or use plans to the management system 1 and receives simulated values, measured values, values relating to the status of the water network and cost structures for a present and/or future water and/or current consumption from the management system 1.

The optimization environment 7 receives exported data, namely characteristic properties of the elements in the water network, from the simulation environment 4, or the related units. The optimization environment 7 also receives a simulation model 5 or a physical structure from the simulation environment 4. The optimization environment 7 is given, as additional data, a target function, operational and/or physical boundary conditions, and maintenance information. In this case, the operational boundary conditions include, for example, prices and/or cost structures for energy and/or water.

In order to introduce the functionality of optimization into an arrangement as shown in FIG. 1, the following exemplary steps can be implemented:

In a first step, a simulation environment 4 is at least partially integrated in the management system 1 if such a simulation environment is not yet provided. In this case, the simulation unit 10 or simulation environment 4 is configured such that it reads values measured in real time from the management system 1 or from a data store with historical data 2. The simulation unit 10 or simulation environment 4 can be configured such that simulated results can be written to the "historical" data store 2. As a result, an "online simulation environment" is realized, with online meaning in this context that the simulation is based on real-time data.

In a second step, the physical structure (topology) of the hydraulic simulation model 5 and the real parameters of all elements (pumps, lines, etc.) in the network simulation system are exported to the optimization environment 7. It is assumed here that the physical structure of the hydraulic simulation model 5 contains all of the elements in the field 6 of the water network and their real parameters in correct fashion. It is further assumed that the results of the hydraulic simulation model 5 correctly represent the real water network by means of flows, pressures, and tank or reservoir levels. Furthermore, the specific properties of different types of pumps and valves and electrical and mechanical potential powers are stored or are read from external sources. As soon as the hydraulic simulation model 5 is changed, this step and the subsequent steps are repeated.

The physical structure or the network model is transformed and reduced into a so-called optimization model 8 in the optimization environment 7 by means of the optimization unit. This step is implemented automatically or in automated fashion.

In addition to the simplified physical structure of the model and the respective parameters of the individual model elements, the target function and the boundary conditions should to be set. Field measurements existing in the management system and/or simulated values of unmeasured nodes in the respective water network, expenditure for current, expenditure for treated water from different supply sources or as a function of different supply sources, maintenance information, operational information, status information and further information which can be used for the optimization are obtained by a link to the management system 1 or to the data store with historical data 2. The previously mentioned data can be configured individually or in combination as additional data.

The integrated prediction unit 3 for predicting the consumption of water calculates future demand on the basis of the information which is available in the historical data store or data store with historical data 2.

As soon as the optimization model 8 is set up, on the basis of a calibrated simulation model, and the behavior of the water network is represented as best possible, an algorithm and solver 9 which solves the target function of the optimization are used. The target function of the optimization was defined in addition to the operational boundary conditions to be taken into consideration.

The schedules or use plans resulting from the optimization are transmitted into one data store, e.g., the historical data store 2 or into the management system 1. In this case, a plurality of options are possible: the new setpoint values are (i) sent directly to the controllable elements in the field 6 and/or (ii) visualized on a user interface, with said setpoint values being used as setpoint value inputs for manual inputting, and (iii) stored in the data store 2.

In addition to periodically recalculating the respective schedules of pumps, valves, reservoirs and tanks, the optimization and scheduling or use planning takes into consideration variable real-time status information.

As soon as there is a problem in the field 6, for example a failure or a fault of or in a pump occurs or a tank becomes inoperative owing to maintenance work, this information is passed on directly to the optimization environment 7, which establishes or calculates, the schedules or use plans anew and matches them to the new situation once the simulation model has also been correspondingly matched.

As soon as the principles and/or boundary conditions on which the establishment of the schedules or use plans is based change, for example the predicted consumption differs too greatly from the measured consumption at that time, this information is passed on directly to the optimization environment 7, which determines or calculates the schedules anew and matches them to the new situation.

Advantageously, optimized schedules or use plans for pumps and control valves, tanks and/or reservoirs can also be provided to water supply companies even if this optimization function cannot be implemented by the already operationally used network simulation system. As a result, a change to the network modeling system does not influence the optimization as long as the export of the model and the link to the management system 1 or the data store 2 is possible.

Therefore, the described approach ensures additional functionality, while investment such as the installation of a completely new network modeling system is avoided.

As soon as the optimization function has been integrated completely in the management system 1, results are accessible directly in the operating environment. Access to all of the devices in the management system 1, such as representation of time profiles, reporting or information management, is possible.

The management system-based implementation can advantageously provide an open control loop. This open control loop can have user interaction, wherein determined optimized schedules for pumps, control valves, tanks, and reservoirs can be accepted.

The management system-based implementation can advantageously provide a closed control loop. This closed control loop can realize direct transmission of newly established setpoint values into the field 6 by the management system 1 and/or the at least one processing unit.

Figure 2:
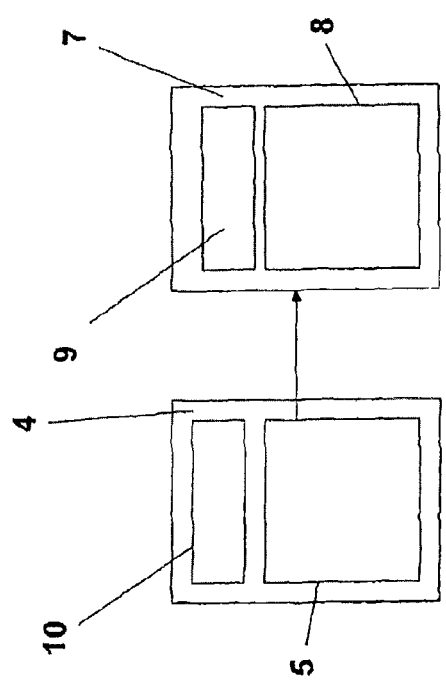
FIG. 2 shows a schematic view of the structure of the functionality of the optimization in accordance with an exemplary embodiment of the present disclosure.

FIG. 2 shows a schematic view of the structure of the functionality of the optimization in accordance with an exemplary embodiment of the present disclosure. In FIG. 2, a network modeling system has a simulation environment 4 with a simulation device 10. A simulation model 5 is generated in the simulation environment 4. The network modeling system exports a network model as an exported file in a standard format, such as an XML format, to the optimization environment 7. In the optimization environment 7, a simplified optimization model is generated by an algorithm which can be implemented by means of program code means from the simulation model incorporating necessary further input parameters and the respective optimization model 8 is solved with a solver.

The conversion and simplification of the simulation model to give an optimization model takes place in an automated fashion. The simplified model means in this context that the number of existing model nodes and model equations is reduced, with the result that the optimization problem generated from the optimization model can still be solved sufficiently quickly.

A computer program product such as a computer readable medium which can be run on a correspondingly configured data processing device (e.g., computer or computer system) and which includes the features of an exemplary method for optimizing the operation of a network such as a supply network, water network, or water supply network, being executed in an exemplary arrangement according to the disclosure. According to an exemplary embodiment, the computer program product, such as a computer readable medium having a computer program stored thereon the computer program being configured to cause a computer to execute the features of an exemplary method for optimizing the operation of a network such as a supply network, water network, or water supply network according to an exemplary embodiment of the present disclosure.

The present disclosure also includes any desired combinations of exemplary embodiments and configuration features or developments as long as they are not mutually exclusive.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS

1 Management system
2 Historical data store
3 Prediction unit for predicting demand
4 Simulation environment
5 Simulation model
6 Field
7 Optimization environment
8 Optimization model
9 Solver
10 Simulation unit

What is claimed is:

1. An arrangement for determining set point values for controllable elements in a network including one of a supply network, a water network, or a water supply network, the arrangement comprising:
   a management system processing unit for driving elements of the network and a plurality of other processing units;
   at least one simulation processing unit with a simulation environment for generating a hydraulic simulation model of the network, which relates to a plane of nodes that include distribution and withdrawal points of the network; and
   an optimization processing unit with an optimization environment for converting and simplifying the hydraulic simulation model, wherein the optimization environment receives exported data from the simulation environment, generates a simplified optimization model from the exported data through an algorithm that is implemented through program code executed by a processor, and uses the optimization model and at least one of received additional data and measurement and field data to calculate optimized schedules as temporally changeable set point value series for driving controllable elements in the network and providing the schedules to the management system processing unit,
   wherein said exported data describes a physical structure of the hydraulic simulation model and elements thereof,
   wherein the algorithm reduces a number of existing model nodes and model equations in the simplified optimization model,
   wherein the simulation processing unit is configured to, in real-time, read values measured in real-time from the management system and the simulation is based on the real-time data,
   wherein the optimization unit takes into consideration variable real-time status information by dynamically calculating the schedules anew and matching them to a new situation once the simulation model has also been correspondingly matched, and
   wherein each processing unit is included in at least one processor.

2. The arrangement as claimed in claim 1, wherein the management system processing unit at least one of sends new set point values directly to the controllable elements, displays the new set point values on a user interface, and stores the new set point values in a data store.

3. The arrangement as claimed in claim 1, wherein the additional data at least one of defines and includes a target function for optimization of an operation, and physical and operational boundary conditions for optimization of the operation.

4. The arrangement as claimed in claim 1, wherein optimization of scheduling or use planning by the optimization processing unit, in addition to periodic recalculation of respective schedules of at least one of pumps, valves, reservoirs, and tanks, utilizes at least one of variable status information and measurement data, and establishes and determines at least one of new schedules and use plans matched to a situation.

5. The arrangement as claimed in claim 1, wherein an expansion of the simulation environment is affected by an optimization solution.

6. The arrangement as claimed in claim 1, comprising:
   at least one historical data store.

7. The arrangement as claimed in claim 1, comprising:
   a prediction processing unit for predicting a demand for water or gas.

8. The arrangement as claimed in claim 1, comprising:
   a user interface on which schedules can be visualized.

9. The arrangement as claimed in claim 1, wherein driving elements in the network, include at least one of pumps, valves, vanes and tanks.

10. The arrangement as claimed in claim 1, wherein a target function used in the optimization processing unit is focused or aimed at minimizing at least one of operational costs and energy consumption.

11. A method for determining set point values for controllable elements of a network including one of a supply network, a water network, or a water supply network of a water supply company, in an arrangement including a management system processing unit for driving elements of the network and a plurality of other processing units; at least one simulation processing unit with a simulation environment for generating a hydraulic simulation model of the network, which relates to a plane of nodes that include distribution and withdrawal points of the network; and an optimization processing unit with an optimization environment for converting and simplifying the hydraulic simulation model, wherein each processing unit is included in at least one processor, the method comprising:
  reading in real-time, in the simulation processing unit, values measured in real-time from the management system and using the real-time data in the simulation;
  receiving, in the optimization environment, data exported by the simulation environment and additional data in the optimization environment;
  generating a simplified optimization model from the exported data through an algorithm that is implemented through program code executed by a processor;
  calculating optimized schedules as temporally changeable set point value series for driving controllable elements in the network based on the optimization model and at least one of received additional data and measurement and field data; and
  providing the schedules to the management system processing unit,
  wherein said exported data describes a physical structure of the hydraulic simulation model and elements thereof,
  wherein the algorithm reduces a number of existing model nodes and model equations in the simplified optimization model, and
  wherein, in the optimization processing unit and based on variable real-time status information, the schedules are dynamically calculated anew and matched to a new situation once the simulation model has also been correspondingly matched.

12. The method as claimed in claim 11, comprising at least one of:
  sending new set point values directly to the controllable elements;
  displaying the new set point values on a user interface; and
  storing the new set point values in a data store.

13. The method as claimed in claim 11, wherein an expansion of the simulation environment is affected by an optimization solution.

14. The method as claimed in claim 11, wherein optimization the scheduling or use planning through the optimization processing unit and periodic recalculation of respective schedules of at least one of pumps, valves, reservoirs and tanks, is based on at least one of variable status information and measurement data, the method comprising:
  establishing at least one of new schedules and use plans matched to a situation based on the at least one of variable status information and measurement data.

15. The method as claimed in claim 11, comprising:
  minimizing at least one of operational costs and energy consumption based on a target function used in the optimization processing unit.

16. The method as claimed in claim 11, wherein when a problem arises in the controllable elements of the network, the method comprises:
  passing information on the problem in the controllable elements directly to the optimization environment; and
  predetermining, in the optimization environment, schedules based on the problem in the controllable elements, and matching the schedules to a new situation when the simulation model is also matched to the new situation.

17. The method as claimed in claim 12, wherein an expansion of the simulation environment is affected by an optimization solution.

18. The method as claimed in claim 12, wherein optimization the scheduling or use planning through the optimization processing unit and periodic recalculation of respective schedules of at least one of pumps, valves, reservoirs and tanks, is based on at least one of variable status information and measurement data, the method comprising:
  establishing at least one of new schedules and use plans matched to a situation based on the at least one of variable status information and measurement data.

19. The method as claimed in claim 12, comprising:
  minimizing at least one of operational costs and energy consumption based on a target function used in the optimization processing unit.

20. A non-transitory computer readable medium with program code stored thereon of a method for determining set point values for controllable elements of a network including one of a supply network, a water network, or a water supply network of a water supply company, in an arrangement including a management system processing unit for driving elements of the network and a plurality of other processing units; at least one simulation processing unit with a simulation environment for generating a hydraulic simulation model of the network, which relates to a plane of nodes that include distribution and withdrawal points of the network; and an optimization processing unit with an optimization environment for converting and simplifying the hydraulic simulation model, wherein each processing unit is included in at least one processor, the computer readable medium when placed in communicable contact with at least one of the plurality of processing units causes the at least one processing unit to execute the method comprising:
  reading in real-time, in the simulation processing unit, values measured in real-time from the management system and using the real-time data in the simulation;
  receiving, in the optimization environment of the optimization processing unit, data exported by the simulation environment and additional data in the optimization environment;
  generating, in the optimization processing unit, a simplified optimization model from the exported data through an algorithm that is implemented through program code executed by a processor;
  calculating, in the optimization processing unit, optimized schedules as temporally changeable set point value series for driving controllable elements in the network based on the optimization model and at least one of received additional data and measurement and field data; and
  providing the schedules to the management system processing unit,
  wherein said exported data describes a physical structure of the hydraulic simulation model and elements thereof,
  wherein the algorithm reduces a number of existing model nodes and model equations in the simplified optimization model, and
  wherein, in the optimization processing unit and based on variable real-time status information, the schedules are dynamically calculated anew and matched to a new situation once the simulation model has also been correspondingly matched.

* * * * *